(12) United States Patent
Bansod et al.

(10) Patent No.: US 11,966,407 B1
(45) Date of Patent: Apr. 23, 2024

(54) SYSTEMS AND METHODS FOR COMMUNICATING WITH A PLURALITY OF DATABASES

(71) Applicant: Luma Health, Inc., San Francisco, CA (US)

(72) Inventors: Aditya Bansod, San Francisco, CA (US); Marcelo Oliveira, San Francisco, CA (US)

(73) Assignee: Luma Health, Inc., San Mateo, CA (US)

( * ) Notice: Subject to any disclaimer, the term of this patent is extended or adjusted under 35 U.S.C. 154(b) by 0 days.

(21) Appl. No.: 17/079,053

(22) Filed: Oct. 23, 2020

Related U.S. Application Data

(60) Provisional application No. 62/925,701, filed on Oct. 24, 2019.

(51) Int. Cl.
*G06F 16/25* (2019.01)
*G06F 16/23* (2019.01)

(52) U.S. Cl.
CPC ........ *G06F 16/252* (2019.01); *G06F 16/2343* (2019.01); *G06F 16/258* (2019.01)

(58) Field of Classification Search
CPC ... G06F 16/252; G06F 16/2343; G06F 16/258
See application file for complete search history.

(56) References Cited

U.S. PATENT DOCUMENTS

| | | | |
|---|---|---|---|
| 11,416,806 B1* | 8/2022 | Aggarwal | G06F 12/0811 |
| 2010/0325206 A1* | 12/2010 | Dayal | G06Q 10/10 |
| | | | 709/204 |
| 2012/0020218 A1* | 1/2012 | Li | H04L 47/14 |
| | | | 370/235 |
| 2014/0350989 A1* | 11/2014 | Telatar | G06Q 10/1097 |
| | | | 705/7.21 |
| 2018/0181454 A1* | 6/2018 | Lin | G06F 11/0793 |
| 2019/0026839 A1* | 1/2019 | Drangmeister | G06Q 40/125 |
| 2019/0155795 A1* | 5/2019 | Xiao | G06F 9/52 |
| 2019/0163679 A1* | 5/2019 | Srinivasa | G16H 30/20 |

* cited by examiner

*Primary Examiner* — Albert M Phillips, III
*Assistant Examiner* — Fatima P Mina
(74) *Attorney, Agent, or Firm* — Wilson Sonsini Goodrich & Rosati

(57) ABSTRACT

Systems and methods are described for communicating with a plurality of databases. An example method includes: initiating a communication with a database from a plurality of databases; selecting from a plurality of integration templates an integration template corresponding to the database; using the selected integration template to generate a communication procedure corresponding to the communication; and using the communication procedure to provide the communication to the database.

21 Claims, 6 Drawing Sheets

Integration Engine 100

SYSTEMS AND METHODS FOR COMMUNICATING WITH A PLURALITY OF DATABASES

CROSS-REFERENCE TO RELATED APPLICATIONS

This application claims the benefit of U.S. Provisional Patent Application No. 62/925,701, filed Oct. 24, 2019, the entire contents of which are incorporated by reference herein.

TECHNICAL FIELD

The present disclosure relates in general to providing a universal integration platform for communicating with electronic health record (EHR) database systems.

BACKGROUND

With the rise of electronic health record (EHR) database systems, healthcare providers are at the mercy of EHR database systems and their front-facing services, features, and APIs, which—in many cases—may be limited in function and scope. Nevertheless, the need for a healthcare provider to maintain updated health records in an efficient manner remains essential. As such, healthcare providers must find solutions to fetch updated data from a wide variety of EHR database systems on an as-needed or anticipatory basis. Furthermore, current implementations of data maintenance may induce data lock mechanisms or similar inefficiencies. Thus, healthcare providers would benefit greatly from efficiently executing commands based on the mechanisms provided by the EHR database systems.

Current implementations available to healthcare providers to grant access to EHR database systems require a widespread understanding of the EHR database systems and the differences therebetween. Furthermore, the current solutions require resource heavy implementations, such as unnecessary persistent connections and Virtual Private Networks (VPNs).

Accessing a wide variety of EHR database systems has proven complex and difficult to maintain for private healthcare providers. Each EHR database system has its own functions or application programming interfaces (APIs), wherein the healthcare provider must integrate their own integration mechanism. For example, EHR database systems might allow data locks or some other inefficient database mechanism implementation. Due to the large number of different implementations, healthcare providers and their corresponding IT vendors dedicate months of integration effort to implement a system to communicate with one or more of these database systems. Furthermore, once the communication platform is in place, the maintenance and resource-heavy implementation is inefficient and expensive to maintain for each and every database system. Accordingly, the need exists for improved communications and efficiently scheduling tasks to maintain a steady concurrency.

The foregoing discussion, including the description of motivations for some embodiments of the invention, is intended to assist the reader in understanding the present disclosure, is not admitted to be prior art, and does not in any way limit the scope of any of the claims.

SUMMARY

A system and method for communicating with a plurality of databases are disclosed. In general, in one aspect, a computer-implemented method includes: initiating a communication with a database from a plurality of databases; selecting from a plurality of integration templates an integration template corresponding to the database; using the selected integration template to generate a communication procedure corresponding to the communication; and using the communication procedure to provide the communication to the database.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, the systems and methods described herein can be used to facilitate or manage communications between a plurality of users and a plurality of database systems. The users can be, for example, healthcare providers (e.g., doctor's offices, medical clinics, etc.) and the database systems can be, for example, electronic health record (EHR) databases provided by various third party EHR database providers. In general, such database systems can utilize different or unique communication protocols, application programming interfaces (APIs), format requirements, and/or functionality, such that communications between the users and each database system may require use of specific communication protocols, APIs, formatting, and/or functionality. Advantageously, to enable the users to communicate with a wide variety of databases, the systems and methods described herein can transform communications (e.g., messages, commands, data, etc.) between the users and the databases, such that each user and database can receive the communications in a desired or expected format. This allows the users and databases to interpret the communications properly and to take appropriate action in response to the communications.

Figure 1:
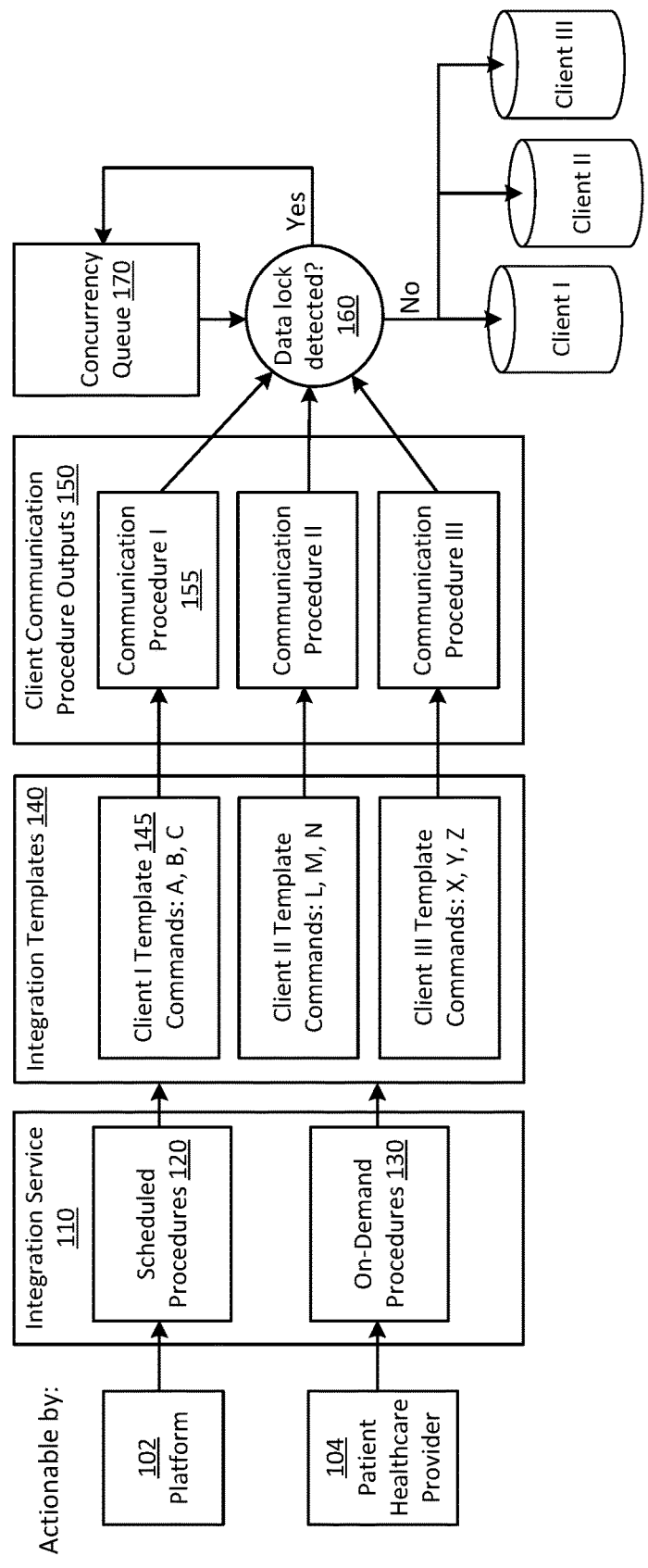
FIG. 1 is a schematic diagram of an integration engine for communicating with electronic health record (EHR) database systems, in accordance with certain embodiments.

FIG. 1 illustrates an integration engine 100 associated with a platform 102 (e.g., an online or cloud-based software platform) that enables a patient healthcare provider 104 (e.g., a doctor's office or medical clinic) to access Electronic Health Record (EHR) database systems. Integration engine 100 includes an integration service 110 and integration templates 140. The integration service 110 includes or provides various procedures capable of integrating into or accessing the EHR database systems. The integration service 110 can include, for example, scheduled procedures 120 and on-demand procedures 130. The scheduled procedures 120 may be actionable by internal procedures automated by the platform 102, for example, at regular intervals, as described herein. The on-demand procedures 130, which may be or include sub-procedures, can be actionable by users of the platform 102. Such users can include, for example, health care providers, such as the healthcare provider 104, and individuals associated with the healthcare providers, such as doctors, nurses, nurse practitioners, and patients. The on-demand procedures 130 can be or include procedures performed in response to certain actions taken by the healthcare provider 104, such as, for example, adding a new patient, adding a new medical appointment, modifying patient data, and/or requesting patient data.

In the depicted example, the integration service 110 is communicatively coupled to the integration templates 140, which include mappings or templates that support communication between the platform 102 and clients of the platform 102, including Client I, Client II, and Client III, which can alternatively be referred to herein as "databases." The clients of the platform 102 may be or include or may be associated with various EHR database systems supported by the platform 102. Such EHR databases may be owned or operated by third party providers of EHR database systems. For example Client I, Client II, and Client III may each be or include an EHR database provided by a different third party, such as EPIC, CERNER, ECLINICALWORKS, NEXTGEN, etc. Additionally or alternatively, each client (e.g., Client I, Client II, or Client III) can be associated with a different healthcare provider, for example, with Client I being associated with the healthcare provider 104 and Client II and Client III being associated with two other respective healthcare providers.

In various examples, each template in the integration templates 140 can be used to facilitate communications between (i) the platform 102 and/or healthcare providers (e.g., the healthcare provider 104) on one side of the integration engine 100 and (ii) the plurality of clients or EHR database systems on another side of the integration engine 100. Each template can be associated with and may identify a specific client from the plurality of clients (e.g., Client I, Client II, or Client III). Each template can provide functionality or commands supported by the associated client and/or can provide communication procedures for the platform 102 to communicate with the associated client or EHR database system.

In some instances, the integration templates 140 may generate communication packets containing client-executable instructions, shown as client communication procedure outputs 150 in FIG. 1. Each communication procedure can include instructions used to execute the integration service 110 on the associated client, according to the respective template of the integration templates 140. For example, the platform 102 may trigger certain scheduled procedures 120 and/or the healthcare provider 104 may trigger certain on-demand procedures 130. Alternatively or additionally, certain scheduled procedures 120 (e.g., a forced sync of databases) can be triggered by the healthcare provider 104. In response, the integration templates 140 may identify a specific EHR database system (from a plurality of EHR database systems) associated with the triggered scheduled procedures 120 and/or on-demand procedures 130 and, in response, may generate or retrieve one or more templates corresponding to the identified EHR database system. The templates can be used to generate client communication procedure outputs 150 (e.g., including commands, messages, and/or data) that correspond to the scheduled procedures 120 and/or on-demand procedures 130 and that can be received and interpreted by the identified EHR database or associated client(s). In some instances, for example, the integration templates 140 can translate and/or transform the scheduled procedures 120 and/or on-demand procedures 130, such that the resulting communication procedure outputs 150 can be properly interpreted and understood by the identified EHR database or associated client. Upon receipt of the client communication procedure outputs 150, the EHR database or the associated client can take action corresponding to the scheduled procedures 120 and/or on-demand procedures 130. Such action can include, for example, retrieving data, storing data, modifying data, or updating data from or in the EHR database. Advantageously, use of the integration service 110, the integration templates 140, and the client communication procedure outputs 150 allows the platform 102 and the healthcare provider 104 to interact with a wide variety of EHR database systems, which may have different communication protocols, APIs, input/output format requirements, and/or functionality. The integration engine 100 can enable the healthcare provider 104 to interact with multiple EHR database systems on-demand and as needed.

In general, the integration engine 100 can facilitate communications between the platform 102, the healthcare provider 104, and one or more EHR database clients. The integration engine 100 can facilitate communications (e.g., including commands and/or data), for example, from the platform 102 or the healthcare provider 104 to the clients (e.g., Client I). Additionally or alternatively, the integration engine 100 can facilitate communications (e.g., including commands and/or data) from the clients (e.g., Client I) to the platform 102 or the healthcare provider 104. In each case, the integration templates 140 can be used to ensure communications are received in a desired or intended format, for example, by translating, adjusting, or transforming the communications, as needed.

In some embodiments, the client communication procedure outputs 150 may be associated with a data lock detection process 160. When a data lock is detected, the client communication procedure outputs 150 may be added to a concurrency queue 170 until the data lock is deactivated, as described herein. A data lock can exist or be implemented for a variety of reasons, including, for example, to prevent multiple users or processes from accessing a data item at the same time, or to prevent access to data that may have expired or may be erroneous. In some instances, a data lock can be implemented to allow or accommodate narrow or constrained systems that may be unable to handle parallelized operations and/or may need to be serialized. The concurrency queue 170 may or may not be assigned an order.

In certain implementations, the integration templates 140 can include client I template 145 as shown in FIG. 1. The client I template 145 can include commands A, B, and C. After receiving the scheduled procedures 120 and/or the on-demand procedures 130 from the integration service 110, the client I template 145 can generate (or be used to generate) as output a communication procedure I 155, which can be provided to the data lock detection mechanism 160.

In some examples, commands within a client template (e.g., the client I template 145) may or may not be executed (e.g., by the EHR database system) or may not be included in client communication procedure outputs 150, depending on an age of data associated with the commands or the client template. For example, commands A, B, and C may all be marked for execution; however, if data involved with such execution is older than a predetermined threshold or timeframe, the command may be skipped or may be handled by the recurring scheduled procedures 120, as described herein. If data (e.g., patient data) is determined to be older than a predetermined timeframe or threshold, the data may be marked as "expired." Expired data may be detected across other embodiments, elements, or through other procedures, as described herein (e.g., with respect to FIG. 2). Skipping, locking, or queueing commands based on the age of data for execution at a later time is further explained herein.

Continuing with the previous example, the communication procedure I 155 may be received as input by the data lock detection mechanism 160. In some embodiments, when a data lock is detected, the communication procedure I 155 can be passed into the concurrency queue 170, which can repeatedly use the data lock detection mechanism 160 to check the status of any data locks. Once a data lock is not detected or has been lifted for the communication procedure I 155, the concurrency queue 170 may release the communication procedure I 155 for delivery to its associated client and/or for execution on the associated client (e.g., an EHR database).

In various examples, the integration service 110 and the integration templates 140 may pass information to and/or from clients associated with EHR database systems. Such information can include, for example, appointment data and/or patient data. The appointment data may include information related to a particular appointment, such as, for example, healthcare provider data, location of appointment, type of appointment, date of appointment, duration of appointment, notes related to the appointment, and patient data associated with the appointment, if applicable. The patient data may include, for example, phone number, scheduled appointments, diagnoses, health records, procedures, and/or monetary balances.

Figure 2:
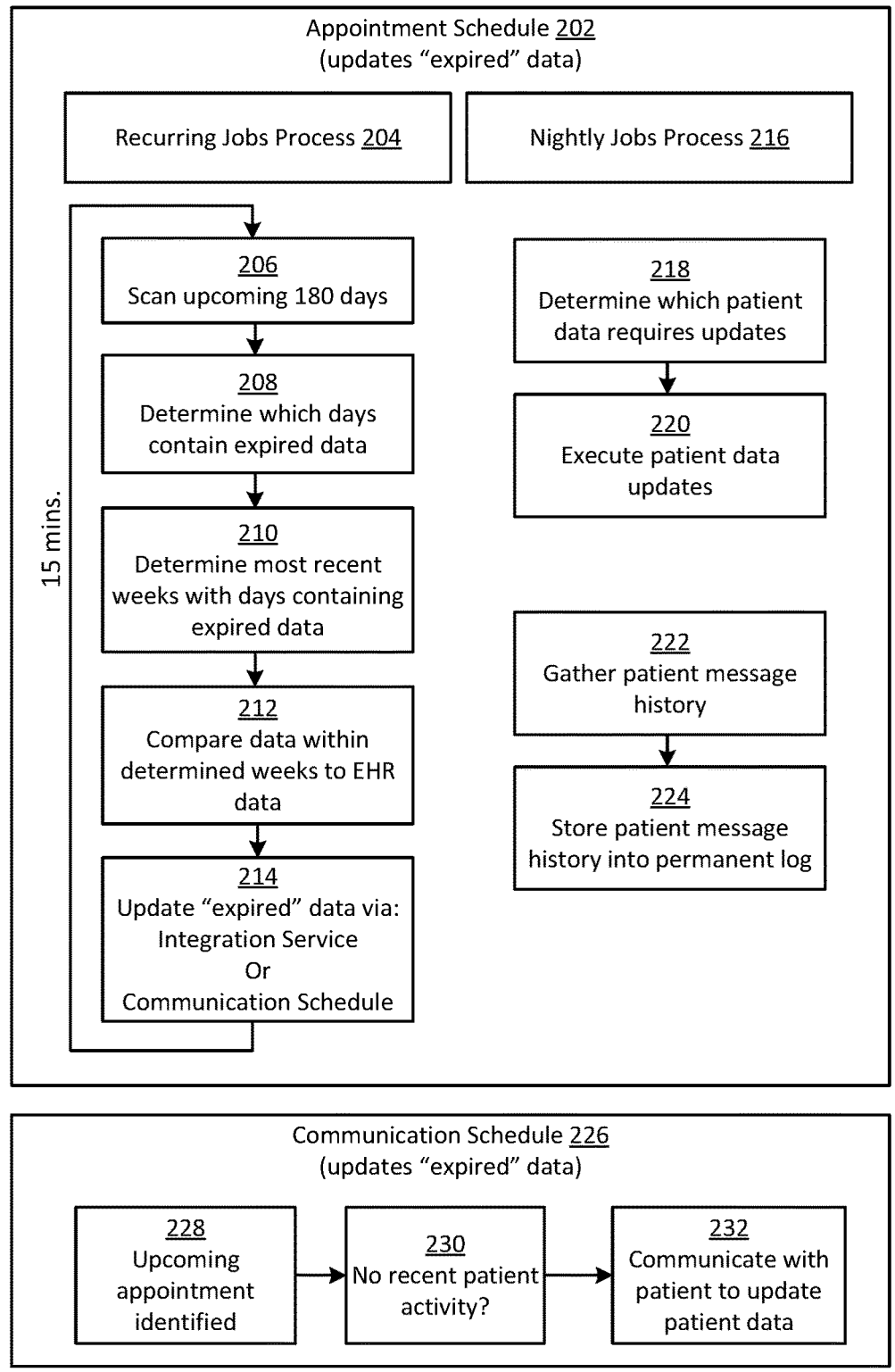
FIG. 2 is a schematic diagram of a scheduled procedures component of an integration engine for communicating with EHR database systems, in accordance with certain embodiments.

FIG. 2 illustrates an example of scheduled procedures 200 (e.g., the scheduled procedures 120), which includes an appointment schedule 202 having a recurring jobs process 204. In general, a recurring jobs process, such as the recurring jobs process 204, may be used to perform one or more tasks associated with an EHR database system. For example, a recurring jobs process may be used to add, remove, update, or modify data stored on a local database (e.g., operated or accessed by the healthcare provider 104) and/or data stored in a global database (e.g., operated by an EHR database system provider). A recurring jobs process may be executed repeatedly or periodically according to a predetermined schedule or time frame, which may be defined by a number of seconds, minutes, hours, days, or other unit of time. For example, a recurring jobs process can be executed every 15 minutes, 30 minutes, hour, day, or other time interval.

In the depicted example, the recurring jobs process 204 relates to upcoming appointments (e.g., within the next 180 days at the healthcare provider 104) that are scanned for expired data (step 206). The data being scanned by the recurring jobs process can be or include, for example, data related to medical appointments, such as appointment dates/times, appointment participants (e.g., doctor and/or patient), appointment location, appointment purpose, etc. The upcoming appointments may be scanned every 15 minutes, as shown in FIG. 2, or at other desired time intervals, for example, depending on how frequently the related data is expected to change. An initial step of the recurring jobs process 204 in this example can be to determine which of the upcoming appointments or upcoming days of appointments have or are associated with data that is older than a predetermined age (step 208). In some embodiments, data older than the predetermined age or that is no longer current or accurate can be considered to have "expired," as shown in FIG. 2.

Once the days having expired data are identified (in step 208), the recurring jobs process 204 can further determine the most recent weeks that include days with expired data (step 210). The recurring jobs process 204 can further compare the data of these most recent weeks with respective data stored in one or more EHR database systems (step 212). The recurring jobs process 204 can further update expired data to be consistent with the most recent or current data stored on an EHR database system (step 214). Such updates can be performed using an integration service, such as the integration service 110, described above with respect to FIG. 1. In some examples, the data can be updated on a local database (e.g., operated or accessed by the healthcare provider 104), such that data on the local database accurately reflects data stored in the one or more EHR database systems. Alternatively or additionally, if data stored on an EHR database system is determined to be "expired," or older than other "expired" data (e.g., on the local database), the "expired" data stored for the upcoming appointment may not be retrieved from the EHR database system but may instead be marked for updates via a separate communication schedule, as described herein. The recurring jobs process 204 may be executed individually, concurrently, randomly, or in a predetermined order, as described herein with respect to FIG. 3.

Still referring to FIG. 2, the appointment schedule 202 further includes a nightly jobs process 216, which can be run periodically (e.g., nightly) to identify any patient data (e.g., health information, insurance information, pre-appointment information, address, or contact information) or other data that is not current (step 218). The nightly jobs process 216 can update such identified patient data, as needed (step 220). For example, the nightly jobs process 216 can update patient data in a local database operated by healthcare provider to be consistent with patient data stored in one or more EHR database systems. Alternatively or additionally, the nightly jobs process 216 can update patient data in the one or more EHR database systems to be consistent with patient data stored in the local database.

In some embodiments, the nightly jobs process 216 further gathers a patient message history (step 222), which may be generated or stored on a messaging platform (e.g., a component of the platform 102). According to one embodiment, the present system can push the patient message history for one or more patients to an EHR database system. The patient message history can be stored in a permanent log (e.g., outside the platform 102) as a backup or for third-party processing (step 224). The permanent log may be associated with an EHR database system, a third-party log tracker, or any other storage medium.

According to some embodiments, the scheduled procedures 200 further includes a communication schedule 226 that can handle automated communications to and/or from a patient in an effort to update data associated with the patient. In some examples, the communication scheduler 226 can identify an upcoming appointment involving a patient (step 228). The communication schedule 226 can determine if the patient's information is up-to-date, for example, by identifying any recent activity involving the patient (step 230). Such recent activity can include, for example, attending an appointment, scheduling an appointment, receiving or responding to scheduled communications, engaging with automated tasks or reminders, or performing other standard patient activities, within a recent time period (e.g., a previous day, week, or month). If a patient has not been involved in any such recent activities, the communication schedule 226 may determine that the patient's data is out-of-date and needs to be updated. The communication schedule 226 may then trigger a communication protocol with the associated patient in an effort to obtain information from the patient that can be used to update any out-of-date data (step 232). The communication protocol can utilize or include, for example, text messages, email, or phone calls.

Figure 3:
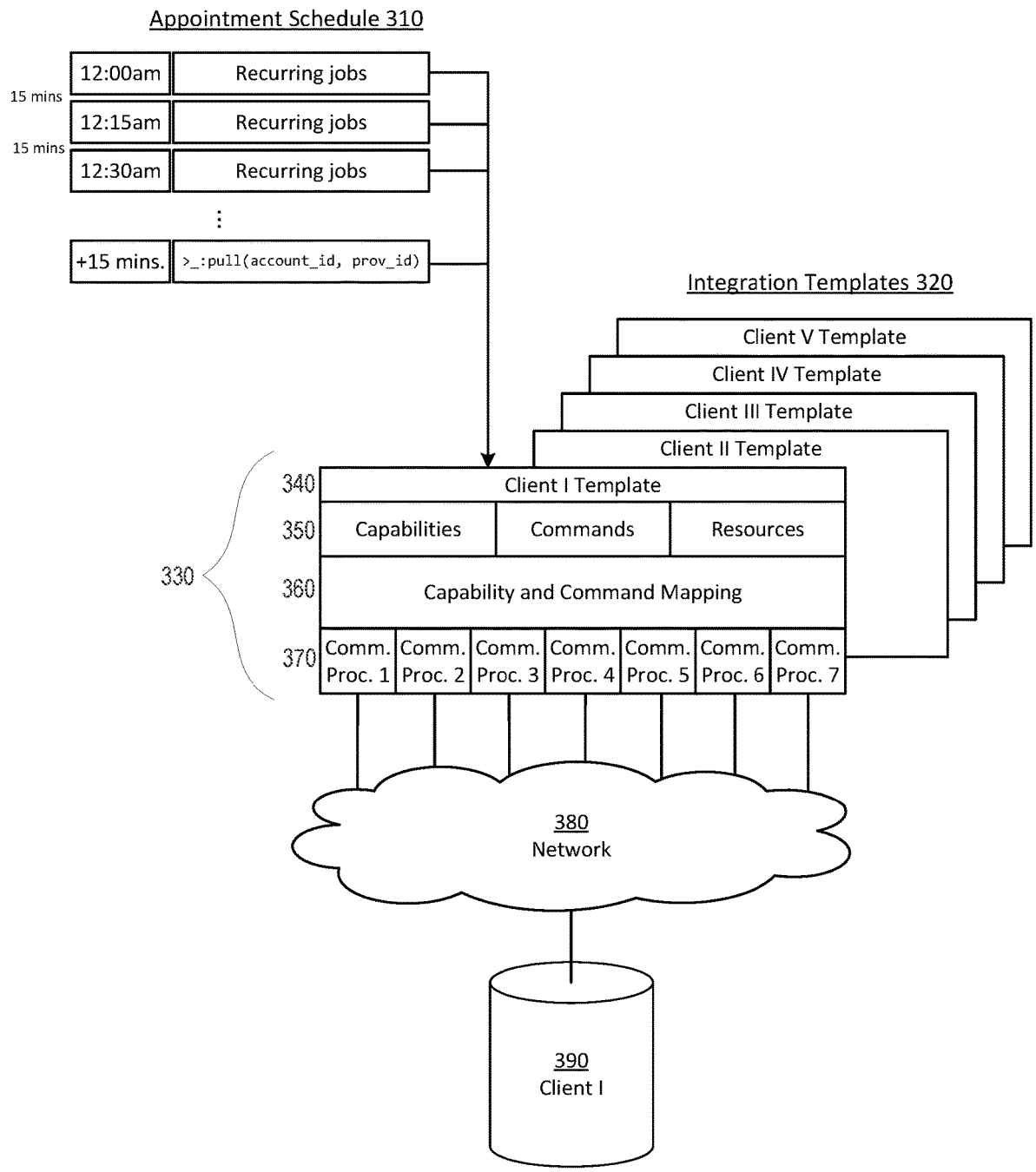
FIG. 3 is a schematic diagram illustrating layers of interaction between an integration service and an EHR database system, in accordance with certain embodiments.

FIG. 3 illustrates an example in which layers of integration are utilized to provide communication with an EHR database system, such as Client I. According to some embodiments, an appointment schedule 310 (e.g., the appointment schedule 202) can include or execute recurring jobs and may utilize integration templates 320 (e.g., the integration templates 140) for the recurring jobs, as needed, such as at least once every fifteen (15) minutes. The appointment schedule 310 can access or be communicatively coupled to the integration templates 320, which may include a template for each client, such as Client I template 330 (e.g., the Client I template 145). The appointment schedule 310 can use the integration templates 320 to send or receive communications to or from the respective clients, as described herein.

In the depicted example, each integration template in the integration templates 320 can include a plurality of integration layers. For example, the Client I template 330 can include a first integration layer 340 that can identify the respective client (Client I in this case) and provide an interface to facilitate communications between the client and the platform or healthcare provider. The Client I template 330 can include a second integration layer 350 that provides information regarding capabilities, commands, and/or resources of the client associated with client I template 330. The Client I template 330 can include third integration layer 360 that provides for a mapping between capabilities or commands of the platform (e.g., the platform 102 or the healthcare provider 104) and respective capabilities or commands of the client. For example, the third integration layer 360 can indicate how a communication from the platform should be translated or adjusted so that the associated client (e.g., Client I) can properly interpret the communication from the platform. Additionally or alternatively, the third integration layer 360 can indicate how a communication from the client should be translated or adjusted so that the platform can properly interpret the communication from the client. This allows each component to receive communications in an expected or desired format. The fourth integration layer 370 includes can include one or more client communication procedures and may be communicatively coupled to a respective client 390 (Client I) by way of a network 380. The network 380 may correspond to or include a local area network (LAN), a wide area network (WAN), a wireless LAN (WLAN), a wireless WAN (WWAN), a corporate intranet, the public Internet, or any other type of network configured to provide a communications path between networked computing devices.

Figure 4A:
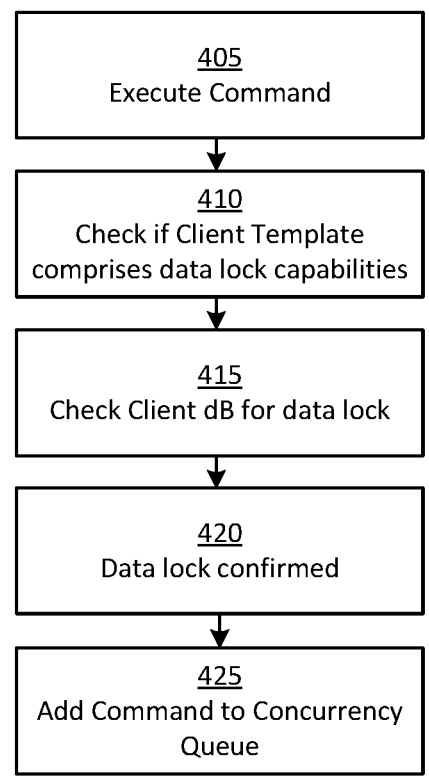
FIG. 4A is a flowchart of a data lock detection procedure, in accordance with certain embodiments.

FIG. 4A illustrates an example of a data lock detection procedure 400, which may be utilized by an integration engine (e.g., the integration engine 100), as described herein, to detect a data lock when a command is executed for a particular client. The data lock detection procedure 400 can begin when a command is executed (step 405), for example, by an integration service (e.g., integration service 110). In response, one or more parameters of an indicated client template (e.g., including data lock parameters) can be fetched (step 410) and used to determine (415) whether or not a data lock exists or should exist for any data attempted to be accessed by the command. When a data lock is confirmed to exist for the data (step 420), the command (or corresponding communication procedure) can be added (step 425) to a concurrency queue (e.g., concurrency queue 170), which can hold the command until the data lock is removed and the command is able to be executed.

Figure 4B:
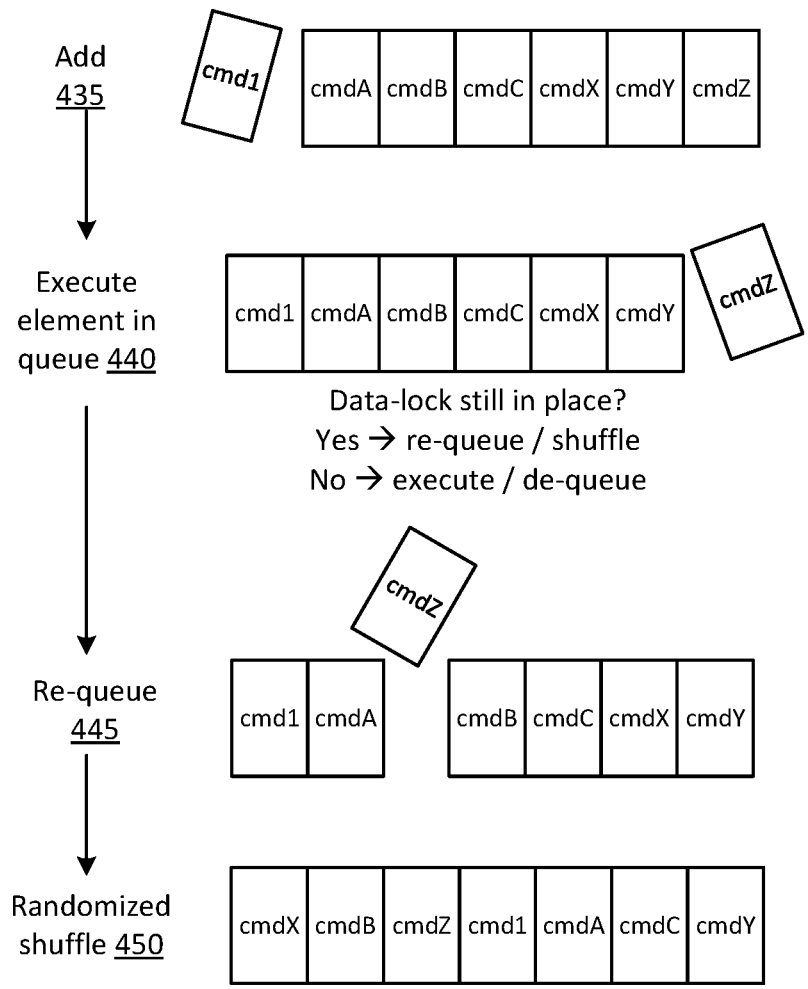
FIG. 4B is a schematic diagram of a procedure for managing a concurrency queue, in accordance with certain embodiments.

FIG. 4B illustrates an example procedure for a concurrency queue 430 (e.g., the concurrency queue 170) in which multiple commands can be stored until associated data locks are removed, according to some embodiments. For example, when a data lock is detected, a command entitled "cmd1" can be added to the concurrency queue 430 (step 435). Each command in the concurrency queue 430 or at a top of the concurrency queue 430 can execute or trigger (e.g., at periodic intervals) a data lock detection procedure (e.g., the data lock procedure 400) to determine whether a respective data lock is still in place, as shown in FIG. 4 with "cmdZ" (step 440). If the data lock is still in place, the command (e.g., cmdZ) may be retained within or added back into the concurrency queue 430 (step 445). In some implementations, when a command is added to the concurrency queue 430, the concurrency queue 430 can be at least partially shuffled to provide a randomized efficiency boost (step 450).

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 5:
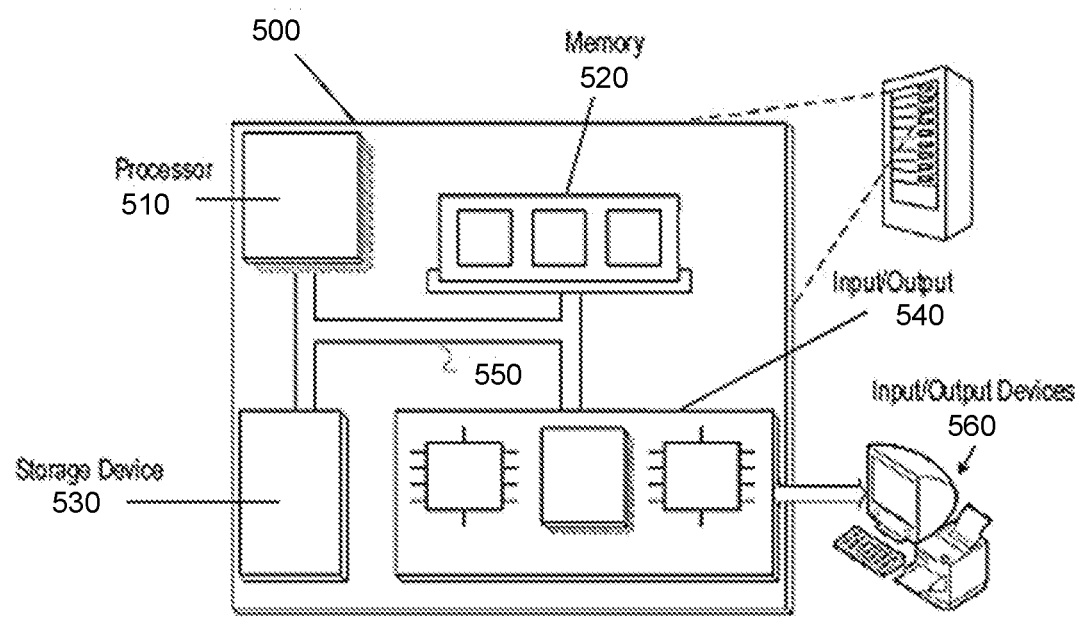
FIG. 5 is a block diagram of an example computer system, in accordance with certain embodiments.

FIG. 5 is a block diagram of an example computer system 500 that may be used in implementing the technology described herein. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a nonvolatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-state drive, a flash drive, or some other large capacity storage device. For example, the storage device may store long-term data (e.g., database data, file system data, etc.). The input/output device 540 provides input/output operations for the system 500. In some implementations, the input/output device 540 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of" or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of communicating with a plurality of databases having sets of data that may be expired, the method comprising:
   maintaining a template database in an integration engine, wherein the template database stores a plurality of integration templates;
   automatically initiating, based on a predetermined schedule, a communication with a database from a plurality of databases via the integration engine;
   selecting, from the plurality of integration templates stored in the template database, an integration template corresponding to the database;
   using the selected integration template to generate a communication procedure corresponding to the communication; and
   using the communication procedure to provide the communication to the database,
      wherein the integration template comprises a plurality of integration layers, wherein a first integration layer of the plurality of integration layers provides an interface to facilitate communications, a second integration layer of the plurality of integration layers provides capabilities or commands of the communication based on the respective capabilities or commands of the database, and a third integration layer of the plurality of integration layers maps and translates the communication to a format that the database is capable to interpret, wherein a data lock is implemented as a part of the communication procedure when the capabilities or commands provided by the second integration layer mark a set of data of the communication as expired data based at least in part on an age of the set of data.

2. The method of claim 1, wherein the plurality of databases are provided by a plurality of third party database providers.

3. The method of claim 1, wherein the plurality of databases comprise electronic health record databases.

4. The method of claim 1, wherein the communication comprises a scheduled procedure for managing data in the database at predetermined time intervals.

5. The method of claim 4, wherein managing data comprises searching for and updating expired data.

6. The method of claim 1, wherein the communication comprises an on-demand procedure triggered by actions of a healthcare provider with respect to the database, and wherein the actions comprise at least one of retrieving data, storing data, modifying data, or updating data.

7. The method of claim 1, wherein each integration template from the plurality of integration templates corresponds to a respective database from the plurality of databases, and wherein each integration template transforms communications into communication procedures for the respective database.

8. The method of claim 1, wherein using the selected integration template comprises transforming the communication into the communication procedure according to at least one of communication protocols, format requirements, or functionality used by the database.

9. The method of claim 1, wherein using the communication procedure to provide the communication to the database comprises determining that no data lock is detected with respect to the communication.

10. The method of claim 1, wherein using the communication procedure to provide the communication to the database comprises:

determining that a data lock is detected with respect to the communication;

in response to the determination, adding the communication procedure to a concurrency queue;

determining that the data lock has been removed; and releasing the communication procedure from the concurrency queue.

11. A system comprising:

one or more computer systems comprising one or more processors and a memory storing instructions that, when executed by the one or more processors, cause the one or more processors to perform operations comprising:

maintaining a template database in an integration engine, wherein the template database stores a plurality of integration templates;

automatically initiating, based on a predetermined schedule, a communication with a database from a plurality of databases via the integration engine, wherein the plurality of databases have sets of data that may be expired;

selecting, from the plurality of integration templates stored in the template database, an integration template corresponding to the database;

using the selected integration template to generate a communication procedure corresponding to the communication; and using the communication procedure to provide the communication to the database, wherein the integration template comprises a plurality of integration layers, wherein a first integration layer of the plurality of integration layers provides an interface to facilitate communications, a second integration layer of the plurality of integration layers provides capabilities or commands of the communication based on the respective capabilities or commands of the database, and a third integration layer of the plurality of integration layers maps and translates the communication to a format that the database is capable to interpret, wherein a data lock is implemented as a part of the communication procedure when the capabilities or commands provided by the second integration layer mark a set of data of the communication as expired data based at least in part on an age of the set of data.

12. The system of claim 11, wherein the plurality of databases are provided by a plurality of third party database providers.

13. The system of claim 11, wherein the plurality of databases comprise electronic health record databases.

14. The system of claim 11, wherein the communication comprises a scheduled procedure for managing data in the database at predetermined time intervals.

15. The system of claim 14, wherein managing data comprises searching for and updating expired data.

16. The system of claim 11, wherein the communication comprises an on-demand procedure triggered by actions of a healthcare provider with respect to the database, and wherein the actions comprise at least one of retrieving data, storing data, modifying data, or updating data.

17. The system of claim 11, wherein each integration template from the plurality of integration templates corresponds to a respective database from the plurality of databases, and wherein each integration template transforms communications into communication procedures for the respective database.

18. The system of claim 11, wherein using the selected integration template comprises transforming the communication into the communication procedure according to at least one of communication protocols, format requirements, or functionality used by the database.

19. The system of claim 11, wherein using the communication procedure to provide the communication to the database comprises determining that no data lock is detected with respect to the communication.

20. The system of claim 11, wherein using the communication procedure to provide the communication to the database comprises:

determining that a data lock is detected with respect to the communication;

in response to the determination, adding the communication procedure to a concurrency queue;

determining that the data lock has been removed; and releasing the communication procedure from the concurrency queue.

21. A non-transitory computer-readable medium having instructions stored thereon that, when executed by one or more computer processors, cause the one or more computer processors to perform operations comprising:

maintaining a template database in an integration engine, wherein the template database stores a plurality of integration templates;

automatically initiating, based on a predetermined schedule, a communication with a database from a plurality of databases via the integration engine, wherein the plurality of databases have sets of data that may be expired;

selecting, from the plurality of integration templates stored in the template database, an integration template corresponding to the database;

using the selected integration template to generate a communication procedure corresponding to the communication; and using the communication procedure to provide the communication to the database, wherein the integration template comprises a plurality of integration layers, wherein a first integration layer of the plurality of integration layers provides an interface to facilitate communications, a second integration layer of the plurality of integration layers provides capabilities or commands of the communication based on the respective capabilities or commands of the database, and a third integration layer of the plurality of integration layers maps and translates the communication to a format that the database is capable to interpret, wherein a data lock is implemented as a part of the communication procedure when the capabilities or commands provided by the second integration layer mark a set of data of the communication as expired data based at least in part on an age of the set of data.

\* \* \* \* \*